United States Patent
Rakshit et al.

(10) Patent No.: US 11,757,710 B2
(45) Date of Patent: Sep. 12, 2023

(54) COMPUTER TECHNOLOGY FOR SECURITY ENFORCEMENT DURING EDGE COMPUTATIONS

(71) Applicant: International Business Machines Corporation, Armonk, NY (US)

(72) Inventors: Sarbajit K. Rakshit, Kolkata (IN); Partho Ghosh, Kolkata (IN); Shailendra Moyal, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/648,427

(22) Filed: Jan. 20, 2022

(65) Prior Publication Data
US 2023/0231765 A1    Jul. 20, 2023

(51) Int. Cl.
*H04L 41/0806*    (2022.01)
*H04L 41/00*    (2022.01)

(52) U.S. Cl.
CPC .......... *H04L 41/0806* (2013.01); *H04L 41/20* (2013.01)

(58) Field of Classification Search
None
See application file for complete search history.

(56) References Cited

U.S. PATENT DOCUMENTS

| | | | |
|---|---|---|---|
| 8,635,661 B2 | 1/2014 | Shahbazi | |
| 11,271,807 B1* | 3/2022 | Rothschild | .......... H04L 41/0895 |
| 2004/0003032 A1* | 1/2004 | Ma | .......... H04L 67/563 |
| | | | 707/E17.116 |
| 2008/0052384 A1* | 2/2008 | Marl | .......... H04L 12/2807 |
| | | | 709/224 |
| 2018/0123890 A1* | 5/2018 | Merk | .......... H04L 45/563 |
| 2018/0124158 A1* | 5/2018 | Amento | .......... H04L 67/34 |
| 2018/0331916 A1* | 11/2018 | Damaggio | .......... H04L 41/0806 |
| 2019/0260803 A1* | 8/2019 | Bykampadi | .......... H04W 12/10 |
| 2019/0340264 A1* | 11/2019 | Yu | .......... G06F 16/1865 |
| 2020/0228602 A1* | 7/2020 | Spoczynski | .......... H04L 67/56 |
| 2020/0296155 A1 | 9/2020 | McGrath | |
| 2021/0144202 A1 | 5/2021 | Maciocco | |
| 2022/0029930 A1* | 1/2022 | Yilma | .......... H04L 41/122 |

OTHER PUBLICATIONS

Disclosed Anonymously, "Method and System for Dynamic Policy Enforcement at the Edge based on Device Usage", An IP.com Prior Art Database Technical Disclosure, IP.com No. IPCOM000267156D, Sep. 29, 2021, 5 pgs.

(Continued)

*Primary Examiner* — Scott B Christensen
(74) *Attorney, Agent, or Firm* — David B. Woycechowsky

(57) ABSTRACT

Computer technology that each edge computing device has appropriate security software, and associated configuration thereof, to be included in edge computing system deployment having a predetermined security level. The types of security software may include encryption/decryption software, encryption/decryption key handling software and/or security load sharing software. The edge computing devices may include unmanned aerial vehicles and/or other unmanned transport vehicles (for example, wheeled ground vehicles) to transport the respective edge computing devices into physical proximity with the client device that will be using the edge computing system deployment.

18 Claims, 3 Drawing Sheets

(56) References Cited

OTHER PUBLICATIONS

Huang, et al., "Security and Cost-Aware Computation Offloading via Deep Reinforcement Learning in Mobile Edge Computing", Wireless Communications and Mobile Computing vol. 2019, Article ID 3816237, Dec. 23, 2019, 21 pages, <https://doi.org/10.1155/2019/3816237>.

Peng, et al., "Security-Aware Computation Offloading for Mobile Edge Computing-Enabled Smart City", Journal of Cloud Computing: Advances, Systems and Applications, Aug. 28, 2021, 13 pgs., <https://doi.org/10.1186/s13677-021-00262-6>.

\* cited by examiner

COMPUTER TECHNOLOGY FOR SECURITY ENFORCEMENT DURING EDGE COMPUTATIONS

BACKGROUND

The present invention relates generally to the field of edge computing, and more particularly to management of edge devices in an edge computing system.

The Wikipedia entry for "edge computing" (as of 24 Dec. 2021) states, in part, as follows: "One definition of edge computing is any type of computer program that delivers low latency nearer to the requests." (footnotes omitted) This is not the definition of edge computing that is used in connection with the present document. For purposes of this document, edge computing is instead hereby defined as follows: (i) any computing system where a client device sends input data to a cloud and the computer(s), which belong to the cloud, that perform calculations on the input data and send associated output back to the client device is/are located sufficiently close to the client device so that latency in communicating the data is no more than that associated with transmission of data between devices in a Local Area Network (LAN); (ii) the cloud computer(s) that perform the computing are called "edge device(s);" and (iii) the client device/edge device data communication network does not have to be through a LAN, but only that the latency be less than or equal to typical latencies observed when computers communicate data through a LAN.

The recent trend of edge computing extends cloud computing and the Internet of Things (IoT) to the edge of the network. Edge computing moves more computational power and resources closer to end users by increasing the number of endpoints and locating them nearer to the consumers—be they users or devices. Fundamentally, edge computing architectures are built on existing technologies and established paradigms for distributed systems, which means that there are many well understood components available to create the most effective architectures to build and deliver edge use cases. In any edge computation, multiple edge devices are involved, and different edge devices typically have different security capabilities, as is typically the situation when far edge devices are collaborating with each other to perform edge computation.

SUMMARY

According to an aspect of the present invention, there is a method, computer program product and/or system that performs the following operations (not necessarily in the following order): (i) receiving a request to deploy an edge computing system to provide computational work for a client device; (ii) identifying, by machine logic a set of edge computing device(s) to include in the edge computing system to be deployed; (iii) for each given edge computing device in the set of edge computing device(s), determining required security software and associated security configuration that the given edge computing device must have to meet a predetermined level of security for the edge computing system to be deployed; (iv) for each given edge computing device in the set of edge computing device(s), installing required security software and performing associated security configuration as determined at the determining operation; and (v) deploying the set of edge computing device(s) to obtain the requested edge computing system deployment.

According to an aspect of the present invention, there is a method, computer program product and/or system that performs the following operations (not necessarily in the following order): (i) receive a request to deploy an edge computing system to provide computational work for a client device; (ii) identify, by machine logic a set of edge computing device(s) to include in the edge computing system to be deployed, with each edge computing device including an unmanned aerial vehicle (UAV) that can transport the edge computing device to the vicinity of the client device; (iii) for each given edge computing device in the set of edge computing device(s), determining required security software and associated security configuration that the given edge computing device must have to meet a predetermined level of security for the edge computing system to be deployed; (iv) for each given edge computing device in the set of edge computing device(s), installing required security software and performing associated security configuration as determined at the determining operation; and (v) deploying the set of edge computing device(s) to obtain the requested edge computing system deployment, with the deployment including transporting each edge computing device to the vicinity of the client device by its respective UAV.

According to an aspect of the present invention, there is a method, computer program product and/or system that performs the following operations (not necessarily in the following order): (i) receive a request to deploy an edge computing system to provide computational work for a client device; (ii) identify, by machine logic a set of edge computing device(s) to include in the edge computing system to be deployed, with each edge computing device including an unmanned transport vehicle (UTV) that can transport the edge computing device to the vicinity of the client device; (iii) for each given edge computing device in the set of edge computing device(s), determining required security software and associated security configuration that the given edge computing device must have to meet a predetermined level of security for the edge computing system to be deployed; (iv) for each given edge computing device in the set of edge computing device(s), installing required security software and performing associated security configuration as determined at the determining operation; and (v) deploying the set of edge computing device(s) to obtain the requested edge computing system deployment, with the deployment including transporting each edge computing device to the vicinity of the client device by its respective UTV.

DETAILED DESCRIPTION

Figure 1:
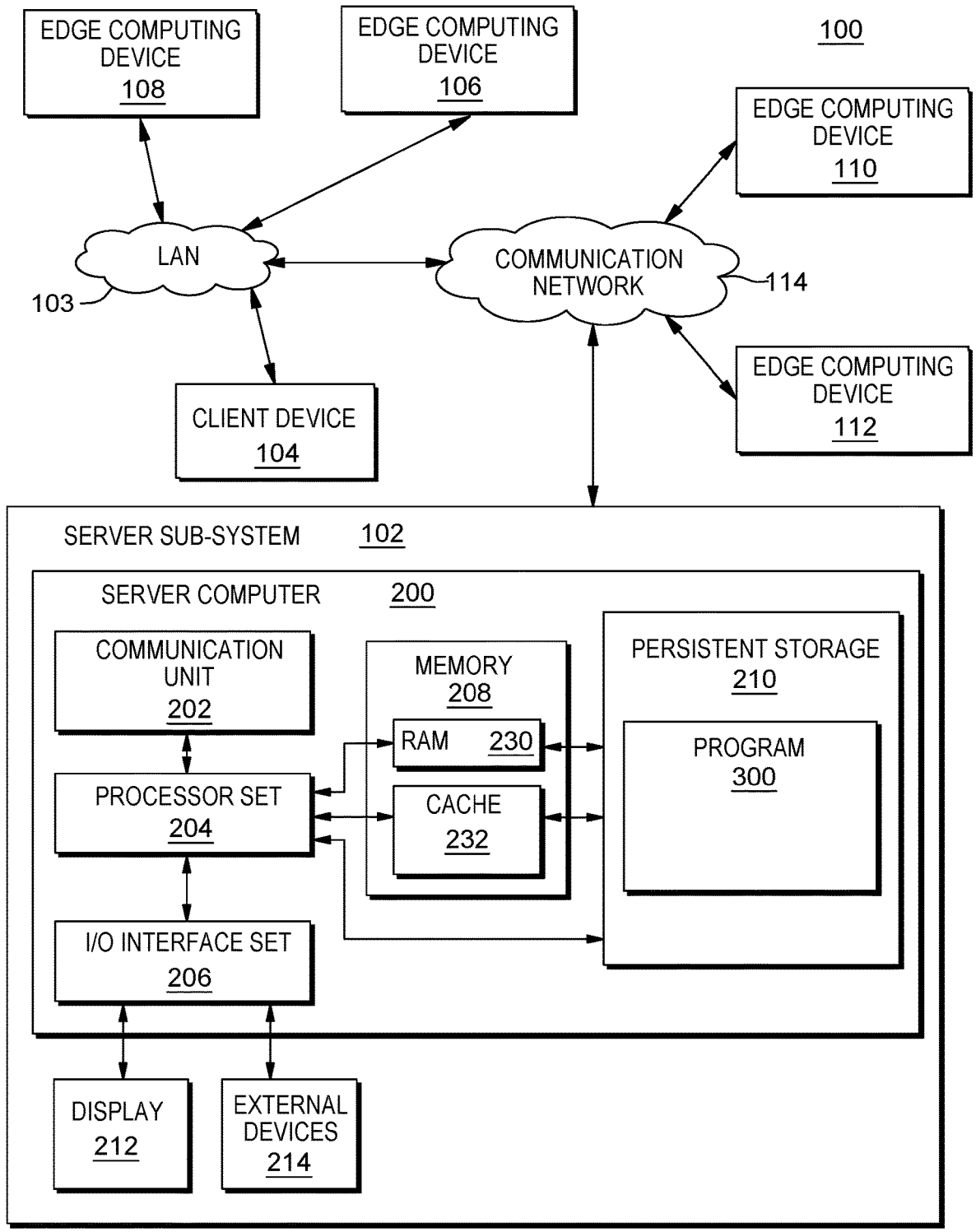
FIG. 1 is a block diagram of a first embodiment of a system according to the present invention.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); local area network (LAN) 103; client device 104; edge computing devices 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
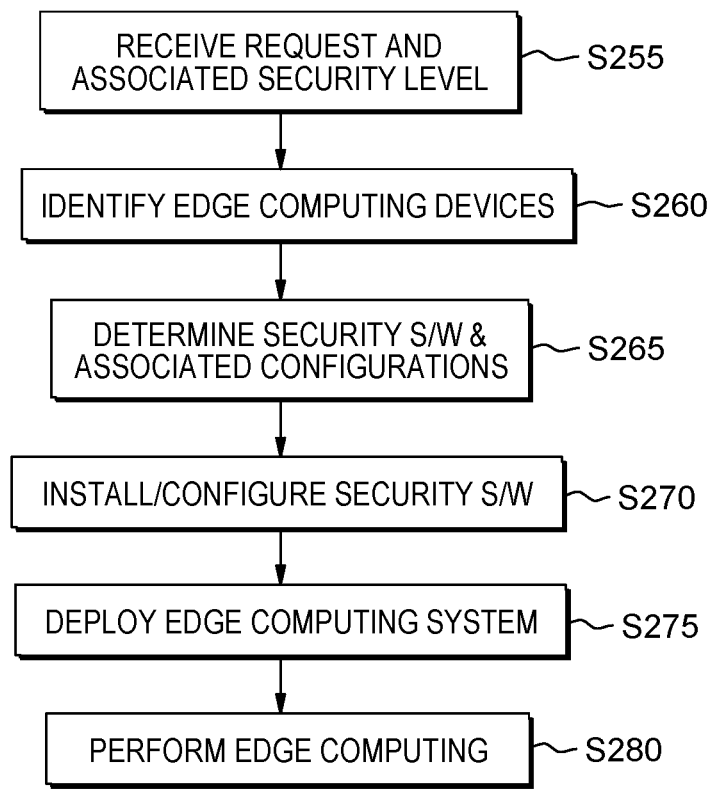
FIG. 2 is a flowchart showing a first embodiment method performed, at least in part, by the first embodiment system.
Figure 3:
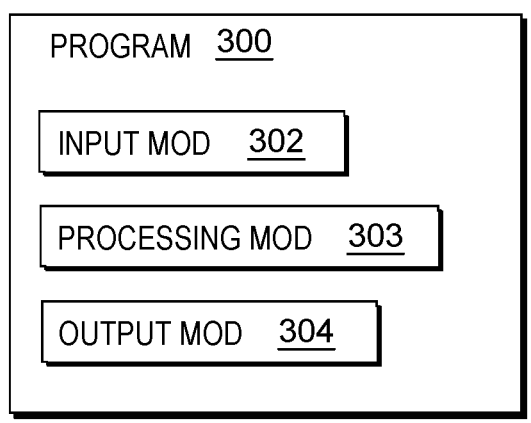
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Processing begins at operation S255, where input module ("mod") 302 receives a request to deploy an edge computing system to provide computational work for client device 104 and an associated security level for the computing work to be performed by the requested deployment. In this example, the request comes from client device 104 through LAN 103 and communication network 114 (which is a wide area network).

Processing proceeds to operation S260, where processing mod 303 identifies a set of edge computing device(s) to include in the edge computing system to be deployed. In this example, edge computing device 106 and 108 are identified as the edge devices to be used for the requested deployment because they are connected to the same LAN as client device 104 and are therefore close enough to be considered as edge computing devices with respect to client device 104 (see definition of edge computing, above, in the Background section).

Processing proceeds to operation S265, where, for edge computing devices 106 and 108, processing mod 303 determines the required security software and associated security configuration that these edge computing devices must have to meet a predetermined level of security specified in the request received at operation S255. In this example, the required security software includes certain encryption/decryption software, key handling software and secure load sharing software.

Processing proceeds to operation S270, where, for selected edge computing devices 106 and 108, output mode 304 installs required security software and performs associated security configuration as determined at operation S265.

Processing proceeds to operation S275, where output mode controls and co-ordinates deployment of selected edge computing devices 106 and 108 to obtain the requested edge computing system deployment.

Processing proceeds to operation S280, where edge computing is performed. More specifically, client device sends input data through LAN 103 to edge computing devices 106 and 108, and edge computing devices perform edge computing and send output data back to client device 104 through LAN 103. In this way, the requested security level of these data communications is ensured.

In the embodiment discussed in the previous paragraphs, the edge computing devices are stationary and do not need to be moved to be close enough (that is, low data communication latency) to perform edge computing for client device 104. Alternatively, in some embodiments, the edge computing devices transport themselves into the local vicinity of the client device so that the edge computing deployment can be formed. This will now be discussed in connection with FIGS. 4A and 4B.

Figure 4A:
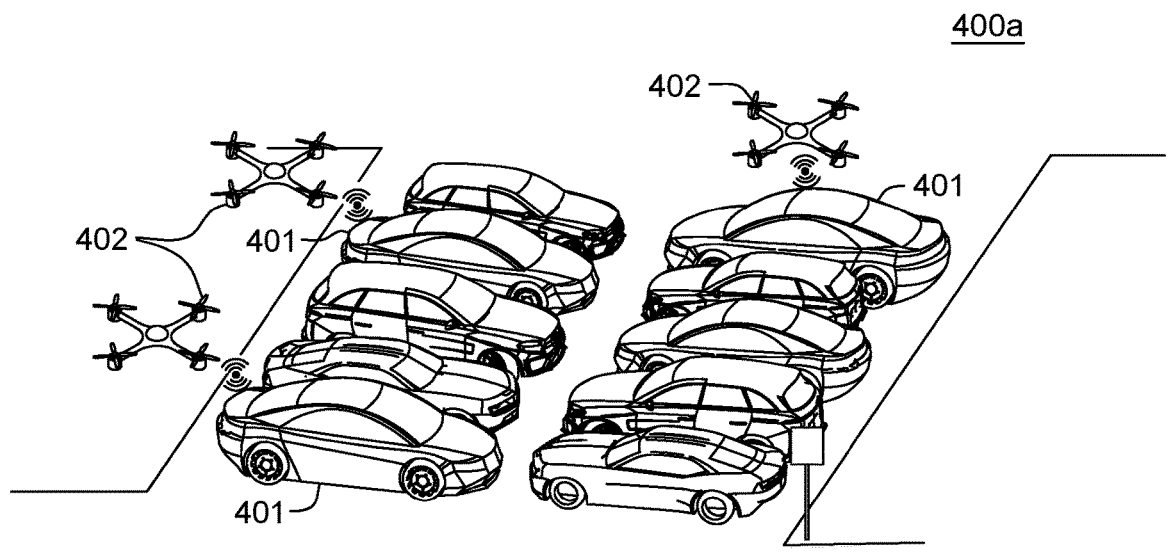
FIG. 4A is a perspective view, at a first time, of the environment of a second embodiment of an edge computing system according to the present invention.
Figure 4B:
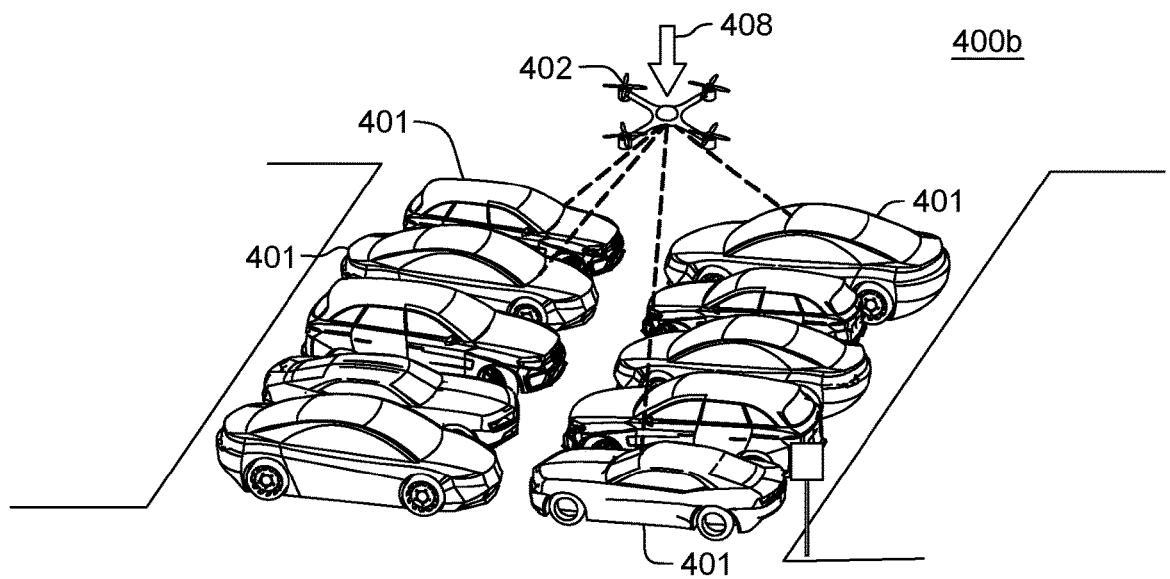
FIG. 4B is a perspective view, at a second time, of the environment of the second embodiment system.

As shown in FIGS. 4A and 4B, edge computing system 400 (that is, 400a at a first point in time and 400b at a second point in time) include: vehicle mounted client devices 401; and unmanned aerial vehicle (UAV) edge computing device set 402. The UAVs transport the set of edge computing devices into close proximity of the client devices to allow for the low latency needed for edge computing. Alternatively, other types of unmanned transport vehicles may be used, such as wheeled vehicles that travel over the ground.

In edge computing system 400, participating edge devices perform at least most of the computations of the various workloads. In this case the security requirement applicable to participating edge devices will be evaluated, and, accordingly, secondary edge device will typically be used in order to ensure that participating edge devices have required software installed and/or are correctly configured for security, so the edge devices selected to participate in performing edge computation will be characterized by sufficient security. in some embodiments, after the edge computation is finished for a given set of workloads, the edge devices can be returned to their respective original states (for example, by uninstalling security software and/or re-configuring to their initial security configurations). As shown in FIG. 4A, the first set of edge computing devices are ensured, by the machine logic of the present invention, to have a required security configuration. Required software is installed and configured as per the need of the edge computing to be performed by the deployment. The first set of edge computing devices performs the edge computation after the security software is installed and configured. As shown by arrow 408 in FIG. 4B, data is received by the edge devices of the UAV edge computing device set. The secondary far edge devices classify the data and share it with the client devices based on their respective security configurations.

III. Further Comments and/or Embodiments

Some embodiments of the present invention may include one, or more, of the following operations, features, characteristics and/or advantages: (i) handles an issue where participating far edge devices may not be have a required level of security to perform the edge computation; (ii) enforces some predetermined, required level of security with respect to the edge devices; (iii) in any edge computing ecosystem, the participating far edge devices will be evaluating if required level security configurations are present with the participating far edge devices; (iv) otherwise, secondary far edge devices will physically be arriving proximity to the participating far edge devices to ensure the participating far edge devices are compliant to perform edge computation; and/or (v) the secondary far edge devices will individually communicate with the participating far edge devices and will ensure the required security configuration is applied and security software is installed with the participating far edge devices.

Some embodiments of the present invention may include one, or more, of the following operations, features, characteristics and/or advantages: (i) based on the identified edge computing requirement, machine logic evaluates the security compliance; (ii) according to this evaluation: the secondary far edge devices will proactively be arranged around the identified edge computing surrounding and these participating far edge devices will be required to be compliant with a predetermined level and/or type of security measure(s); (iii) based on the required security compliance, one or more secondary far edge devices will also be participating in the edge computing so that the required level of security compliance and security load sharing is achieved; and/or (iv) the security measures may include measures such as encrypting, decrypting, and key generation that may be employed to enhance security in the performance of edge computing.

Based on the security compliance, existing security configuration and security software installed in the participating far edge devices, and the security capability of the secondary far edge device, some embodiments will segregate each new edge computing load, and the edge computing workflow will dynamically be selected so that the required security can be ensured with the edge computation. Some embodiments can also use blockchain to ensure the required security is ensured with the participating far edge devices. In some embodiments, the distribution of the edge computing load among the participating far edge devices is controlled based on the individual security configuration.

Some embodiments of the present invention may include one, or more, of the following operations, features, characteristics and/or advantages: (i) each and every far edge device will be identified uniquely, in this case the capacity and capability of each and every far edge device will be identified; (ii) each and every far edge device will have the appropriate security configuration, and security software installed; (iii) relative physical position, distance and direction of each and every far edge device will be identified; (iv) each and every edge computing will be having specific security compliance, that includes encryption logic, key generation logic, etc.; (v) identifies if the available edge devices have the required security software installed or configured appropriately; and/or (vi) identifies what types of edge computing is to be performed.

Based on the analysis of the edge computing specification, some embodiments will identify how many edge devices are required and their respective capability and specification.

Some embodiments of the present invention may include one, or more, of the following operations, features, characteristics and/or advantages: (i) analyzes the edge computing need; (ii) validates only if the participating edge devices have the required security configuration; (iii) identifies which participating far edge devices needs additional security configuration, and needs additional security software installed; (iv) identifies what additional security software is to be installed and what configuration is required; (v) identifies appropriate secondary far edge devices which have the required software installed; (vi) the secondary far edge devices can be drone or spot robots, and will hover over the participating far edge device; (vii) identifies when the far edge devices will be participating in the edge computation; (viii) identifies the relative physical position and direction of the participating far edge devices; (ix) the secondary far edge device will ensure to possess requisite security software and configuration before deployment in the edge computing system; (x) the secondary far edge devices take control of the participating far edge devices before the edge computation is started; (xi) the secondary far edge devices transmit the required software to the participating far edge devices and will configure; (xii) blockchain is used for tracking the software configuration and is applied on the participating far edge devices; (xiii) once the participating far edge devices have required software installed and are configured, the system will initiate the edge computing system and begins performing edge computations thereon; and/or (xiv) considers the data to the participating far edge devices, in this case the secondary far edge devices, and will ensure proper distribution of the data is provided to different participating far edge devices.

Some embodiments of the present invention may include one, or more, of the following operations, features, characteristics and/or advantages: (i) in any edge computing ecosystem, the participating far edge devices will evaluate if the required level of security configuration is present with the participating far edge devices; (ii) otherwise, secondary far edge devices will physically be arriving proximity to the participating far edge devices to ensure the participating far edge devices are compliant to perform the said edge computation; (iii) participating far edge devices will perform multiple checks and operations with participating devices to make sure that security compliance is maintained for the edge computation whether it needs another surrounding devices in arrangement to have the proper compliance environment; (iv) the secondary far edge devices will individually be communicating with the participating far edge devices; (v) ensures the required security configuration is applied and security software is installed with the participating far edge devices; (vi) based on the identified edge computing requirement, the system will be evaluating the security compliance, and accordingly the secondary far edge devices will proactively be arranging around the identified edge computing surrounding; (vii) ensures that the participating far edge devices have the required security compliance; and/or (viii) based on the required security compliance, one or more secondary far edge devices will also be participating in the edge computing so that the required level of security compliance and security load sharing (like encrypting, decrypting, key generation, etc.) can be achieved while performing edge computations.

Some embodiments of the present invention may include one, or more, of the following operations, features, characteristics and/or advantages: (i) based on the security compliance, existing security configuration and security software installed in the participating far edge devices, and the security capability of the secondary far edge device, the system will segregate the edge computing load; (ii) the edge computing workflow will dynamically be selected, so that the required security can be ensured with the edge computation; (iii) uses blockchain to ensure the required security is ensured with the participating far edge devices; (iv) the distribution of the edge computing load among the participating far edge devices can be controlled based on the individual security configuration; (v) in any edge computing ecosystem, the participating far edge devices will evaluate if the required level of security configuration are present with the participating far edge devices; and/or (vi) otherwise, secondary far edge devices will physically be arriving proximity to the participating far edge devices to ensure the participating far edge devices are compliant to perform the said edge computation.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Set of thing(s): does not include the null set; "set of thing(s)" means that there exist at least one of the thing, and possibly more; for example, a set of computer(s) means at least one computer and possibly more.

Virtualized computing environments (VCEs): VCEs can be stored as "images." A new active instance of the VCE can be instantiated from the image. Two types of VCEs are virtual machines and containers. A container is a VCE that uses operating-system-level virtualization. This refers to an operating system feature in which the kernel allows the existence of multiple isolated user-space instances, called containers. This isolated user-space instances may look like real computers from the point of view of programs running in them. A computer program running on an ordinary operating system can see all resources (connected devices, files and folders, network shares, CPU power, quantifiable hardware capabilities) of that computer. However, programs running inside a container can only see the container's contents and devices assigned to the container.

Cloud computing system: a computer system that is distributed over the geographical range of a communication network(s), where the computing work and/or computing resources on the server side are primarily (or entirely) implemented by VCEs (see definition of VCEs in previous paragraph). Cloud computing systems typically include a cloud orchestration module, layer and/or program that manages and controls the VCEs on the server side with respect to instantiations, configurations, movements between physical host devices, terminations of previously active VCEs and the like.

What is claimed is:

1. A computer-implemented method (CIM) comprising:
   receiving, by a client edge device, a request to deploy computational work on the client edge computing device;
   determining, by the client edge computing device, required security software that the client edge computing device must have to meet a predetermined level of security for securely performing the computational work on the client edge computing device;
   instructing, by the client edge computing device, a vehicle-mounted secondary edge computing device that has the required security software to move into proximity of the client edge computing device;
   subsequent to the vehicle-mounted secondary edge computing device moving into proximity of the client edge computing device, downloading the required security software from the vehicle-mounted secondary edge computing device to the client edge computing device;
   installing the required security software on the client edge computing device; and
   subsequent to the installation of the required security software on the client edge computing device, performing computational work on the client edge computing device.

2. The CIM of claim 1 wherein the vehicle-mounted secondary edge computing device is mounted to an unmanned aerial vehicle (UAV).

3. The CIM of claim 1 wherein the required security software includes encryption software.

4. The CIM of claim 1 wherein the required security software includes decryption software.

5. The CIM of claim 1 wherein the required security software includes encryption/decryption key handling software.

6. The CIM of claim 1 wherein the vehicle-mounted secondary edge computing device is mounted to a wheeled vehicle that travels over the ground.

7. A computer program product (CPP) comprising:
   a set of storage device(s); and
   computer code stored collectively in the set of storage device(s), with the computer code including data and instructions to cause a processor(s) set to perform at least the following operations:
   receiving, by a client edge device, a request to deploy computational work on the client edge computing device,
   determining, by the client edge computing device, required security software that the client edge computing device must have to meet a predetermined level of security for securely performing the computational work on the client edge computing device,
   instructing, by the client edge computing device, a vehicle-mounted secondary edge computing device that has the required security software to move into proximity of the client edge computing device,
   subsequent to the vehicle-mounted secondary edge computing device moving into proximity of the client edge computing device, downloading the required security software from the vehicle-mounted secondary edge computing device to the client edge computing device,
   installing the required security software on the client edge computing device, and
   subsequent to the installation of the required security software on the client edge computing device, performing computational work on the client edge computing device.

8. The CPP of claim 7 wherein the vehicle-mounted secondary edge computing device is mounted to an unmanned aerial vehicle (UAV).

9. The CPP of claim 7 wherein the required security software includes encryption software.

10. The CPP of claim 7 wherein the required security software includes decryption software.

11. The CPP of claim 7 wherein the required security software includes encryption/decryption key handling software.

12. The CPP of claim 7 wherein the vehicle-mounted secondary edge computing device is mounted to a wheeled vehicle that travels over the ground.

13. A computer system (CS) comprising:
a processor(s) set;
a set of storage device(s); and
computer code stored collectively in the set of storage device(s), with the computer code including data and instructions to cause the processor(s) set to perform at least the following operations:
  receiving, by a client edge device, a request to deploy computational work on the client edge computing device,
  determining, by the client edge computing device, required security software that the client edge computing device must have to meet a predetermined level of security for securely performing the computational work on the client edge computing device,
  instructing, by the client edge computing device, a vehicle-mounted secondary edge computing device that has the required security software to move into proximity of the client edge computing device,
  subsequent to the vehicle-mounted secondary edge computing device moving into proximity of the client edge computing device, downloading the required security software from the vehicle-mounted secondary edge computing device to the client edge computing device,
  installing the required security software on the client edge computing device, and
  subsequent to the installation of the required security software on the client edge computing device, performing computational work on the client edge computing device.

14. The CS of claim 13 wherein the vehicle-mounted secondary edge computing device is mounted to an unmanned aerial vehicle (UAV).

15. The CS of claim 13 wherein the required security software includes encryption software.

16. The CS of claim 13 wherein the required security software includes decryption software.

17. The CS of claim 13 wherein the required security software includes encryption/decryption key handling software.

18. The CS of claim 13 wherein the vehicle-mounted secondary edge computing device is mounted to a wheeled vehicle that travels over the ground.

* * * * *